United States Patent
Bae et al.

(10) Patent No.: US 9,228,840 B2
(45) Date of Patent: Jan. 5, 2016

(54) APPARATUS AND METHOD FOR MEASURING POSITION USING GPS AND VISIBLE LIGHT COMMUNICATION

(71) Applicant: Samsung Electronics Co., Ltd., Gyeonggi-do (KR)

(72) Inventors: Tae-Han Bae, Seoul (KR); Sun-Gi Gu, Gyeonggi-do (KR); Jae-Seung Son, Gyeonggi-do (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 252 days.

(21) Appl. No.: 13/764,265

(22) Filed: Feb. 11, 2013

(65) Prior Publication Data

US 2013/0211715 A1    Aug. 15, 2013

(30) Foreign Application Priority Data

Feb. 9, 2012    (KR) ........................ 10-2012-0013454

(51) Int. Cl.
  *G01C 21/00*    (2006.01)
  *G01S 5/16*    (2006.01)
  *G01S 19/48*    (2010.01)

(52) U.S. Cl.
  CPC . *G01C 21/00* (2013.01); *G01S 5/16* (2013.01); *G01S 19/48* (2013.01)

(58) Field of Classification Search
  CPC ............ G01C 21/00; G01S 19/48; G01S 5/16
  See application file for complete search history.

(56) References Cited

U.S. PATENT DOCUMENTS

| 7,932,822 | B2 | 4/2011 | Kim et al. | |
|---|---|---|---|---|
| 7,970,537 | B2 | 6/2011 | Ann et al. | |
| 2009/0099772 | A1* | 4/2009 | Chiu et al. | 701/213 |
| 2009/0171571 | A1* | 7/2009 | Son et al. | 701/208 |
| 2009/0284366 | A1* | 11/2009 | Haartsen et al. | 340/531 |

FOREIGN PATENT DOCUMENTS

| JP | 2008281561 | 11/2008 |
|---|---|---|
| JP | 2009288173 | 12/2009 |
| JP | 2010107235 | 5/2010 |
| JP | 2010107237 | 5/2010 |
| KR | 100701146 | 3/2007 |

* cited by examiner

*Primary Examiner* — Mussa A Shaawat
*Assistant Examiner* — Kelly D Williams
(74) *Attorney, Agent, or Firm* — The Farrell Law Firm, P.C.

(57) ABSTRACT

Methods and apparatus are provided for measuring a position of a mobile terminal. A first position is calculated by using a GPS signal. A visible light communication mode of the mobile terminal is activated, when the first position exceeds a predetermined error range. Visible light communication device position information is received. A third position is calculated by using a second position, which corresponds to a position prior to the first position, and the visible light communication device position information.

17 Claims, 7 Drawing Sheets

APPARATUS AND METHOD FOR MEASURING POSITION USING GPS AND VISIBLE LIGHT COMMUNICATION

PRIORITY

This application claims priority under 35 U.S.C. §119(a) to Korean Application Serial No. 10-2012-0013454, which was filed in the Korean Intellectual Property Office on Feb. 9, 2012, the contents of which are hereby incorporated herein by reference.

BACKGROUND OF THE INVENTION

1. Field of the Invention

The present invention relates generally to an apparatus and a method for measuring a position, and more particularly, to an apparatus and a method for measuring a position by using a Global Positioning System (GPS) and visible light communication.

2. Description of the Related Art

Position measurement technology is used by an application system and provides a service of accurately detecting a position of a person or an object, which is a target of attention, and using the detected position. Position measurement technology has been developed and used in various ways depending on an applied method or range, and may include, for example, a GPS, an Assisted GPS (A-GPS), and the like.

IGPS corresponds to a currently operated global satellite navigation system. A GPS receiver receives microwaves transmitted from twenty-four or more satellites rotating at a medium earth orbit, thereby allowing a position vector of the receiver to be determined. Specifically, the GPS receiver receives signals transmitted from three or more GPS satellites, and positions of the satellites and the receiver are determined. A distance between the satellite and the receiver may be calculated by measuring a time difference between the signal transmitted from the satellite and the signal received by the receiver. The transmitted signal contains information on the position of the satellite. When distances from a minimum of three satellites and a position of each satellite are provided, the position of the receiver may be calculated using a method such as trilateration. In general, GPS determines a position by using four or more satellite signals in order to correct an error.

A-GPS corresponds to a technology of measuring a position by receiving position measurement auxiliary information from a mobile communication network or wireless Internet (e.g., Wireless-Fidelity (Wi-Fi)), as well as a GPS signal. A-GPS includes an assistance server containing information on a GPS satellite capable of regionally communicating from a closest distance. The assistance server records satellite information, and calculates and corrects a position corresponding to functions required by a position measurement apparatus, such as, for example, a GPS terminal or the like, instead of the position measurement apparatus. When the GPS terminal has difficulty receiving the GPS signal, A-GPS enables position measurement by receiving satellite information from the assistance server through a mobile communication network or a wireless Internet network. By using A-GPS, it is possible to measure a position in a shadow area by receiving satellite information, and to reduce an "initial position information reception time" (Time To First Fix (TTFF): a time taken while a current position of the terminal is detected), so that position information may be rapidly calculated. Accordingly, A-GPS is widely used together with GPS.

However, position measurement technology using GPS has difficulties measuring a position in a shadow area, such as, for example, an urban area having many tall buildings that block a satellite signal. Further, since a GPS receiver requires a large amount of power to receive a GPS satellite signal in the shadow area, a portable device or the like, having limited power may reduce its effective time due to excessive power consumption. Accordingly, although A-GPS technology is used to measure a position in the shadow area using GPS, the A-GPS also receives satellite information through a mobile communication network or a wireless Internet network. Thus, the position measurement apparatus requires a separate communication module, such as a mobile communication module for mobile communication or a Wi-Fi module for wireless Internet communication.

Visible light communication uses light within a visible light wavelength area. The visible light communication, which mainly uses a Light Emitting Diode (LED) as a light source for communication, has received increasing interest due to depletion of the Radio Frequency (RF) band, crosstalk possibility between various wireless communication technologies, increases in a demand for communication security, and the like.

Visible light communication is performed when a visible light transmitter transmits a visible light by using an LED or a Laser Diode (LD) as a light source, and a visible light receiver receives the visible light by using a Photo Detector (PD) and processes a received visible light signal. The LED can flicker at a high speed. When the LED flickers at a high speed, a human's eye cannot recognize the flickering. The visible light communication may use the LED as a light source of an additional communication device while using the LED for its inherent function. Further, as LED emission efficiency has been improved and a cost thereof has been reduced, the LED is becoming more common in a general illumination market which includes a fluorescent light, an incandescent light and the like, as well as a special illumination market for a portable device, a display, an automobile, a traffic light, a signboard and the like. Accordingly, the possibility of application of visible light communication is increasing in various fields where the LED illumination is installed.

SUMMARY OF THE INVENTION

The present invention has been made to address at least the above problems and/or disadvantages and to provide at least the advantages described below. Accordingly, an aspect of the present invention provides a position measurement apparatus and method using a GPS and visible light communication, which can perform a position measurement in a shadow area, even in a state where mobile communication and wireless Internet communication is not possible, through the visible light communication in performing the position measurement using a GPS signal.

Another aspect of the present invention provides an apparatus and a method for providing more precise position information by using an LED communicable device, for example, an illumination device using the LED and display devices using LED illumination.

In accordance with an aspect of the present invention, a method of measuring a position of a mobile terminal is provided. A first position is calculated by using a GPS signal. A visible light communication mode of the mobile terminal is activated, when the first position exceeds a predetermined error range. Visible light communication device position information is received. A third position is calculated by using a second position, which corresponds to a position prior to the first position, and the visible light communication device position information.

In accordance with another aspect of the present invention, an apparatus for measuring a position is provided. The apparatus includes a GPS receiver for receiving a GPS signal, a GPS position calculator for measuring a first position by using the GPS signal, and a visible light signal transceiver for transmitting and receiving a visible light signal. The apparatus also includes a visible light communication device position calculator for calculating a position of a visible light communication device by using visible light communication device position information received through the visible light signal transceiver. The apparatus additionally includes a position calculator for, when the first position exceeds a predetermined error range, calculating a third position by using a second position, which corresponds to a position prior to the first position, and the position of the visible light communication device. The apparatus further includes a controller for activating a visible light communication mode when the first position exceeds the predetermined error range, and controlling the position calculator to calculate the third position.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
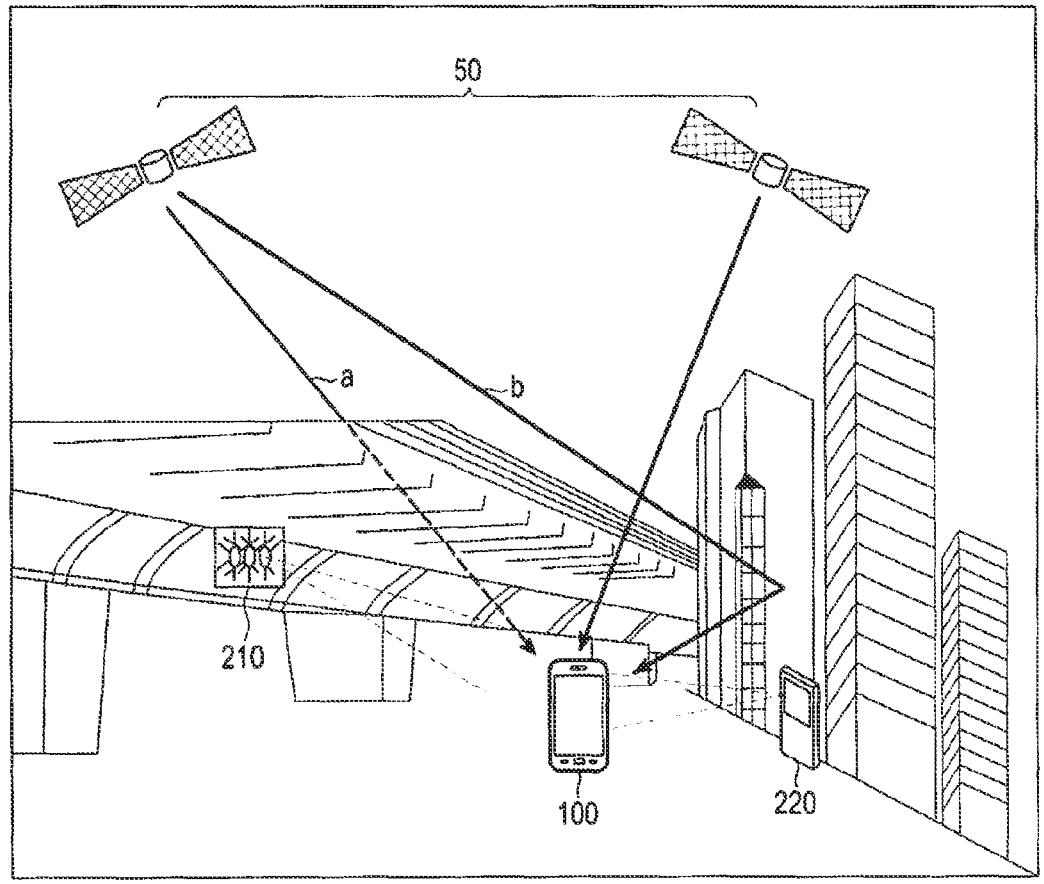
FIG. 1 is a diagram illustrating a position measurement method using position information of a GPS and a visible light communication device, according to an embodiment of the present invention.

Embodiments of the present invention are described in detail with reference to the accompanying drawings. The same or similar components may be designated by the same or similar reference numerals although they are illustrated in different drawings. Further, various specific definitions found in the following description are provided only to help a general understanding of the present invention, and it is apparent to those skilled in the art that the present invention can be implemented without such definitions. Detailed descriptions of constructions or processes known in the art may be omitted to avoid obscuring the subject matter of the present invention.

Embodiments of the present invention provide a position measurement apparatus and a method for measuring a position by using a GPS satellite signal (hereinafter, referred to as a "GPS signal") received from one or more GPS satellites and visible light communication device position information received from a visible light communication device. Particularly, the position measurement apparatus, according to embodiments of the present invention activates a visible light communication mode when a position calculated using a GPS signal exceeds a predetermined error range value while measuring the position by using the GPS signal. Further, the position measurement apparatus receives position information of the visible light communication device from a neighboring visible light communication device and calculates a new position by using the previously calculated position and the position information of the visible light communication device. In addition, the position measurement apparatus determines the new position as a current position when the new position does not exceed a predetermined error range value. When the position measurement apparatus, according to embodiments of the present invention, has difficulties in receiving the GPS signal or when a position measurement result obtained using the received GPS signal is not accurate, the position measurement apparatus calculates the position by using position information of the visible light communication device, so that the position can be measured even in a shadow area, and the position can be more accurately measured.

According to an embodiment of the present invention, the position measurement apparatus may be applied to apparatuses performing various position measurements, such as, for example, a mobile terminal including a navigation terminal, a Personal Digital Assistant (PDA), a smart phone, a mobile phone or like. Embodiments of the present invention describe a case where the position measurement apparatus is applied to a mobile terminal as an example.

In embodiments of the present invention, the visible light communication device includes all devices capable of performing visible light communication, such as, for example, a Liquid Crystal Display (LCD) display device, a large size LED electric bulletin board or the like, using LED BackLight Units (BLU), as well as actual communication devices, such as, for example, a terminal.

FIG. 1 is a diagram illustrating a position measurement method using position information of a GPS signal and a visible light communication device, according to an embodiment of the present invention.

Referring to FIG. 1, each GPS satellite 50 transmits a GPS signal, and a mobile terminal 100 performs a position measurement by using the GPS signals from the GPS satellites 50 Specifically, the mobile terminal 100 may calculate a coordinate value of a position of the mobile terminal 100 by calculating distances between the GPS satellites 50 and the mobile terminal 100 through the GPS signals. The mobile terminal 100 may calculate the coordinate value of the position of the mobile terminal 100 by receiving three GPS signals.

Frequently, a GPS signal may not be received by the mobile terminal 100 because the GPS signal is blocked by obstacles causing a shadow area, such as in an urban area where there are a lot of tall buildings, as illustrated by reference 'a'. A reflected signal, not a straight signal, is received as illustrated by reference 'b'. The mobile terminal 100 performs a position calculation by using an inaccurate GPS signal, and thus, the calculated position has an error.

When the position calculated using the GPS signal exceeds a predetermined error range value, the mobile terminal 100 activates a visible light communication mode to search for a neighboring visible light communication device. The visible light communication device may be a visible light communication device 210 performing visible light communication through LED illumination or a visible light communication device 220 performing visible light communication by using an LED-BLU.

When the neighboring visible light communication devices 210 and 220 are found, the mobile terminal 100 receives visible light communication device position information from each of the visible light communication devices 210 and 220, and calculates a position of the mobile terminal 100 (hereinafter, referred to as a "third position") by using the visible light communication device position information and a position (hereinafter, referred to as a "second position") prior to the first position. The mobile terminal 100 determines the third position as a current position when the third position does not exceed a predetermined error range value.

As described above, the visible light communication devices 210 and 220, according to an embodiment of the present invention, may provide the visible light communication device position information regardless of a request from the mobile terminal 100, or may provide the visible light communication device position information according to the request from the mobile terminal 100. Further, the visible light communication devices 210 and 220 may provide the visible light communication device position information contained therein to the mobile terminal 100, or may receive the visible light communication device position information from a server having the visible light communication device position information and then provide the visible light communication device position information to the mobile terminal 100.

A detailed embodiment of a position measurement method in which the mobile terminal 100 measures a position by using a GPS signal and visible light communication device position information is described in detail below.

Figure 2:
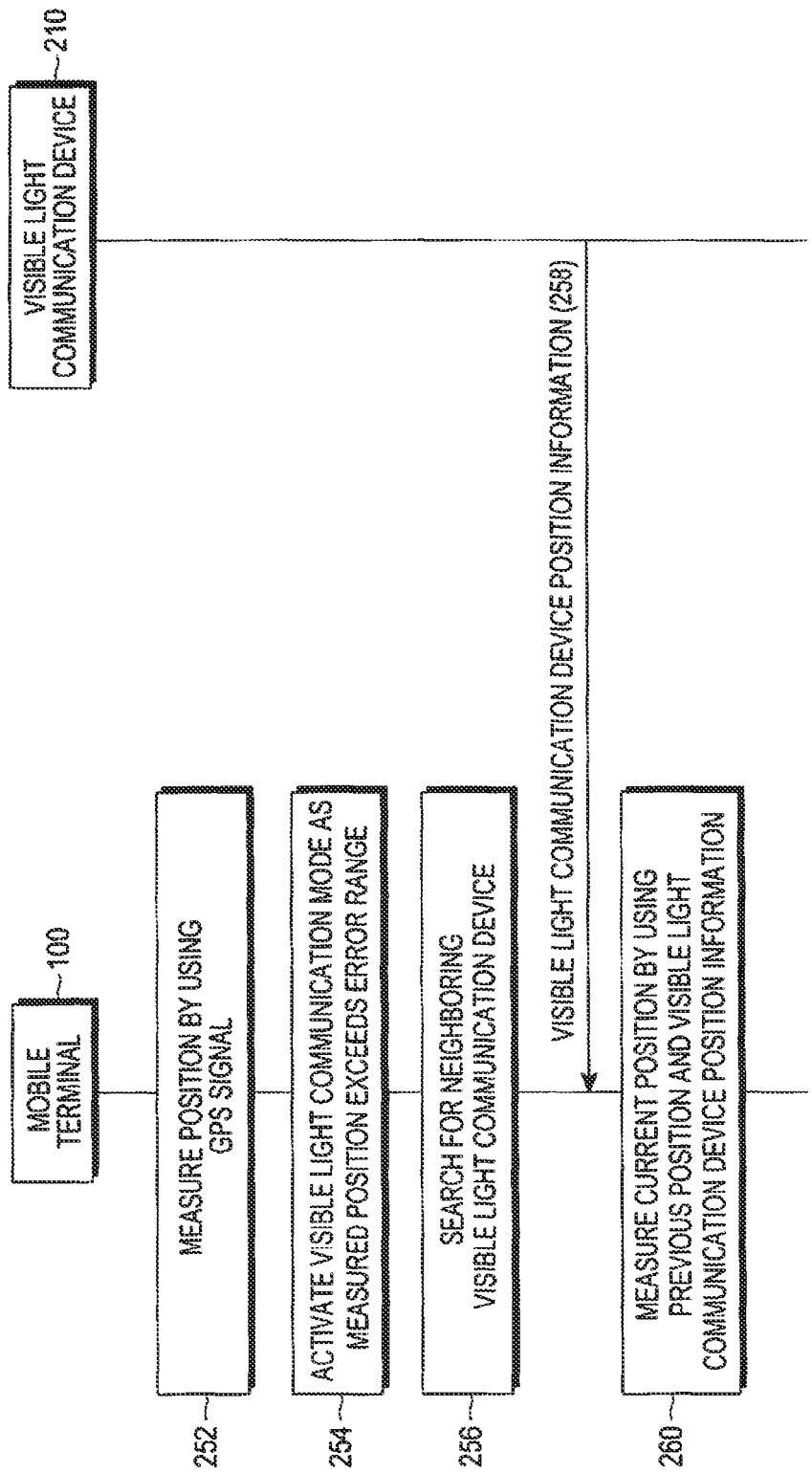
FIG. 2 is a flowchart illustrating a position measurement method using position information of a visible light communication device, according to an embodiment of the present invention.

FIG. 2 is a diagram illustrating a position information measurement method of the mobile terminal, according to an embodiment of the present invention. Referring to FIG. 2, the mobile terminal 100 performs a position measurement by using GPS signals from the GPS satellites 50, in step 252. Specifically, the mobile terminal 100 may calculate a coordinate value of a position of the mobile terminal 100 by calculating distances between the GPS satellites 50 and the mobile terminal 100 through the GPS signals. The mobile terminal 100 may calculate the coordinate value of the position of the mobile terminal 100 by receiving three GPS signals.

The mobile terminal 100 activates a visible light communication mode when the first position calculated using the GPS signal exceeds a predetermined error range value, in step 254, and searches for neighboring visible light communication devices, in step 256. In an embodiment of the present invention, it is assumed that the visible light communication device 210 performing visible light communication through an LED illumination is found.

When the visible light communication device 210 is found, the mobile terminal 100 receives visible light communication device position information transmitted from the found visible light communication device 210, in step 258. The visible light communication device position information may contain information on an inherent ID of the visible light communication device 210, such as, for example, an LED-Identification (LED-ID), a geographical address where the visible light communication device 210 is located, a position of the visible light communication device 210 within a building having the geographical address where the visible light communication device 210 is located, and the like.

When the visible light communication device position information is received, the mobile terminal 100 calculates the third position corresponding to the current position of the mobile terminal 100 by using the second position, corresponding to the position prior to the first position, and the visible light communication device position information, in step 260. Specifically, the mobile terminal 100 may determine the position of the visible light communication device 210 on a map by comparing the geographical address where the visible light communication device 210 is located contained in the visible light communication device position information with prepared map information, and calculating a middle point between the second position and the position of the visible light communication device 210 or a center of gravity, as the third position. Further, the mobile terminal 100 determines the third position as the current position when the third position does not exceed a predetermined error range value.

Although the method of determining the position by receiving visible light communication device position information transmitted from the visible light communication device without a request for the visible light communication device position information from the mobile terminal 100 has been described, the mobile terminal 100 may make a request for and receive the visible light communication device position information, or the visible light communication device may receive the visible light communication device position information from a server and then provide the visible light communication device position information to the mobile terminal 100 in another embodiment of the present invention.

Figure 3:
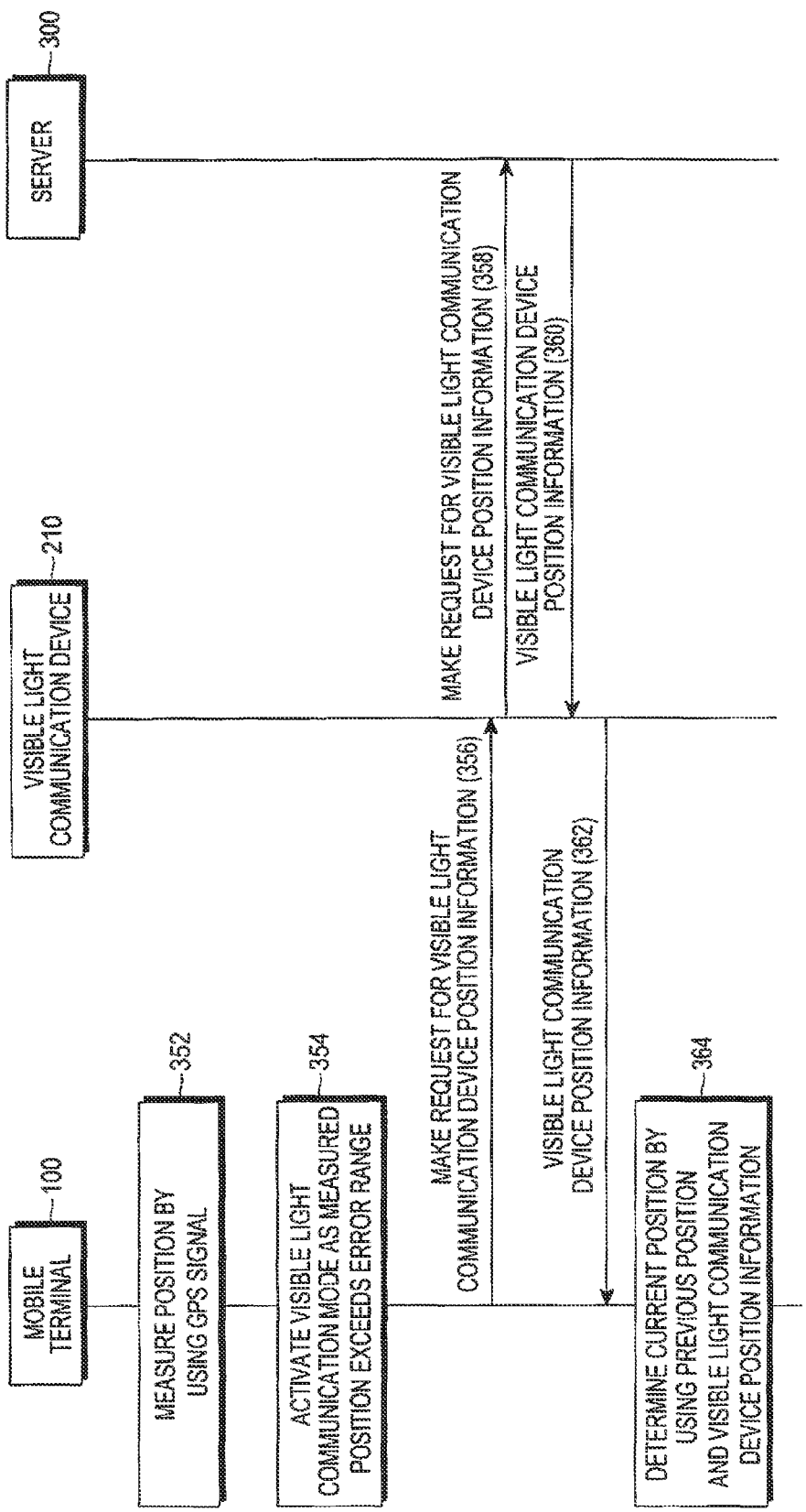
FIG. 3 is a flowchart illustrating a position measurement method using position information of a visible light communication device, according to another embodiment of the present invention.

FIG. 3 is a diagram illustrating the position information measurement method of the mobile terminal, according to another embodiment of the present invention.

Referring to FIG. 3, the mobile terminal 100 performs a position measurement by using a GPS signal from the GPS satellites 50, in step 352. Specifically, the mobile terminal 100 may calculate a coordinate value of a position of the mobile terminal 100 by calculating distances between the GPS satellites 50 and the mobile terminal 100 through the GPS signals. The mobile terminal 100 may calculate the coordinate value of the position of the mobile terminal 100 by receiving three GPS signals.

During the position measurement performance, the mobile terminal 100 activates a visible light communication mode when a first position calculated using the GPS signals exceeds a predetermined error range value, in step 354.

The mobile terminal 100 makes a request for visible light communication device position information, in step 356. The mobile terminal 100 may broadcast a signal making a request for visible light communication device position information when no neighboring visible light communication device is found or a signal making a request for visible light communication device position information according to a user's request. The signal making the request for the visible light communication device position information may contain a device ID of the mobile terminal 100, position information of the mobile terminal 100, and the like. Further, the signal making the request for the visible light communication device position information broadcasted from the mobile terminal 100 may be received by the visible light communication device. In an embodiment of the present invention, it is assumed that the visible light communication device 210 performing visible light communication through an LED illumination receives the signal making the request for the visible light communication device position information from the mobile terminal 100.

When the visible light communication position information is requested by the mobile terminal 100, the visible light communication device 210 makes a request for the visible light communication device position information to a server 300, in step 358. The signal making the request for the visible light communication device position information transmitted to the server 300 may contain an inherent ID (for example, an LED-ID) of the visible light communication device 210, address information of the visible light communication device 210, position information within a building having the address of the visible light communication device 210, and the like.

The server 300 may manage position information of a plurality of visible light communication devices including the visible light communication device 210. When the visible light communication device position information is requested by the visible light communication device 210, the server 300 provides the visible light communication device position information corresponding to the visible light communication device 210, in step 360. The visible light communication device position information may contain a coordinate value indicating the position of the visible light communication device 210.

When receiving the visible light communication device position information from the server 300, the visible light communication device 210 transfers the visible light communication device position information received from the server 300 to the mobile terminal 100, in step 362.

When receiving the visible light communication device position information, the mobile terminal 100 calculates the third position corresponding to the current position of the mobile terminal 100 by using the second position, corresponding to a position prior to the first position, and the visible light communication device position information, in step 364. Specifically, the mobile terminal 100 may determine the position of the visible light communication device 210 on a map by comparing the coordinate value of the visible light communication device 210 contained in the visible light communication device position information with prepared map information, and calculating a middle point between the second position and the position of the visible light communication device 210 or a center of gravity, as the third position. Further, when the third position does not exceed a predetermined error range value, the mobile terminal 100 determines the third position as the current position.

Figure 4:
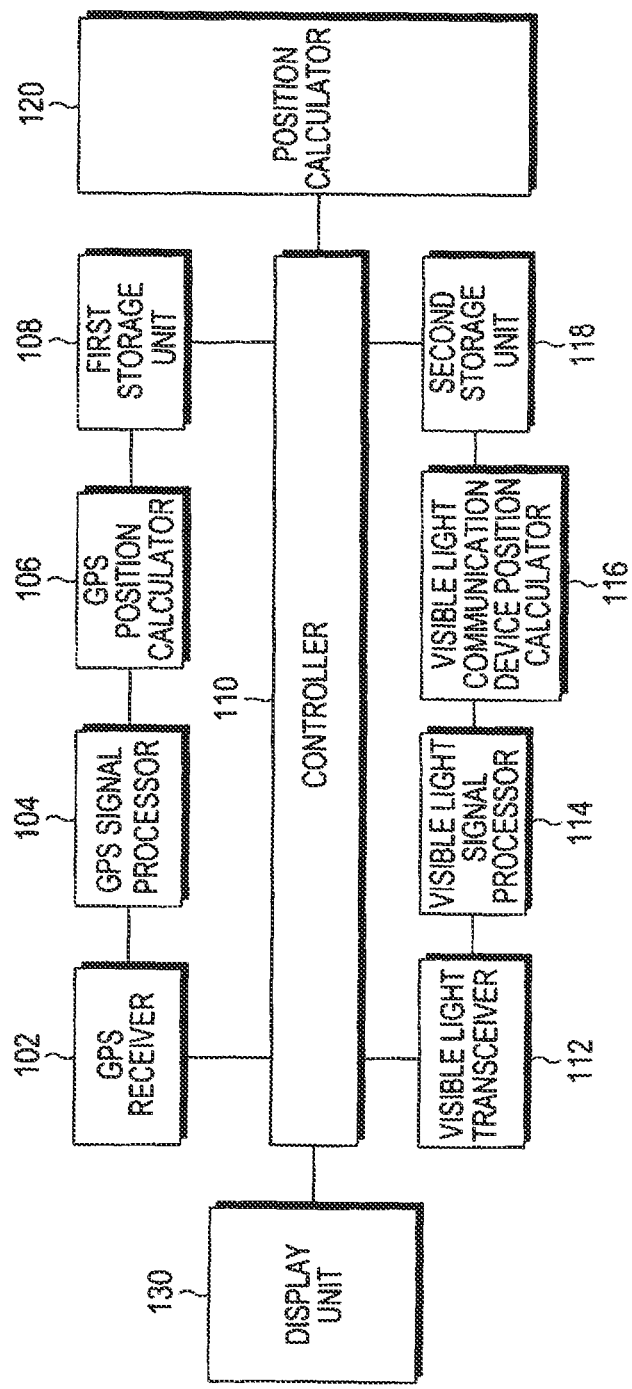
FIG. 4 is a configuration diagram illustrating a mobile terminal, according to an embodiment of the present invention.

FIG. 4 is a configuration diagram illustrating the mobile terminal 100, according to an embodiment of the present invention.

Referring to FIG. 4, the mobile terminal 100 includes a GPS receiver 102, a GPS signal processor 104, a GPS position calculator 106, a first storage unit 108, a controller 110, a visible light transceiver 112, a visible light signal processor 114, a visible light communication device position calculator 116, a second storage unit 118, a position calculator 120, and a display unit 130.

The GPS receiver 102 receives GPS signals from one or more GPS satellites 50. The GPS signal processor 104 processes the GPS signals, and the GPS position calculator 106 calculates a position of the mobile terminal 100 by using the GPS signals. Specifically, the GPS position calculator 106 calculates distances between the GPS satellites 50 and the mobile terminal 100, and calculates a coordinate value of the position of the mobile terminal 100. The mobile terminal 100 may calculate the coordinate value of the position of the mobile terminal 100 by receiving three GPS signals. The first storage unit 108 stores the coordinate value of the position of the mobile terminal 100 calculated using the GPS signals.

The visible light transceiver 112 transmits/receives a visible light signal to/from the visible light communication device, and receives visible light communication device position information from the visible light communication device 210, according to an embodiment of the present invention. The visible light signal processor 112 processes the visible light signal received from the visible light communication device 210 and the visible light signal transmitted by the mobile terminal 100. The visible light communication device position calculator 116 calculates the position of the visible light communication device 210 by using the received visible light communication device position information. For example, the visible light communication device position information calculator 116 calculates the coordinate value of the position of the visible light communication device 210 on the map by comparing the position information of the visible light communication device 210 contained in the visible light communication device position information with the prepared map information. The second storage unit 118 may store the coordinate value of the position of the visible light communication device 210 calculated using the visible light communication device position information.

The position calculator 120 determines whether the first position calculated using the GPS signals exceeds a predetermined error range value. When the first position does not exceed the predetermined error range value, the position calculator 120 determines the first position as the current position, and transfers the determined current position to the controller 110. When the first position exceeds the predetermined error range value, the position calculator 120 determines the first position as a wrong position and informs the controller 110 that a position measurement error is generated. In addition, the position calculator 120 receives the coordinate value corresponding to the position of the visible light communication device 210, and calculates the third position corresponding to the current position of the mobile terminal 100 by using the second position, corresponding to a position prior to the first position, and the coordinate value of the visible light communication device under a control of the controller 110. The position calculator 120 may calculate a middle point between the coordinate value corresponding to the position of the visible light communication device 210 and the coordinate value of the second position, or a center of gravity, as the third position. Further, when the calculated third position does not exceed a predetermined error range value, the position calculator 120 determines the third position as the current position.

The controller 110 performs a general control of each component of the mobile terminal 100, and activates a visible light communication mode according to whether a signal informing that an error in the position measurement using the GPS signal is received from the position calculator 120 during the position measurement performance using the GPS signals. After activating the visible light communication mode, the controller 110 controls such that a visible light signal is transmitted/received through the visible light transceiver 112, and controls such that the position of the visible light communication device 210 is calculated through the visible light transceiver 112, the visible light signal processor 114, and the visible light communication device position calculator 116. Further, when the position of the visible light communication device 210 is calculated, the controller 110 controls the position calculator 120 to calculate the third position of the mobile terminal 100 by using the second position and the position of the visible light communication device 210. In addition, the controller 110 controls the display unit 130 to display the calculated positions on the map.

The display unit 130 may be configured by a display device, such as, for example, an LCD) or an Organic Electroluminescence Display (OLED), and displays the position of the mobile terminal 100 on the map under a control of the controller 110.

Figure 5:
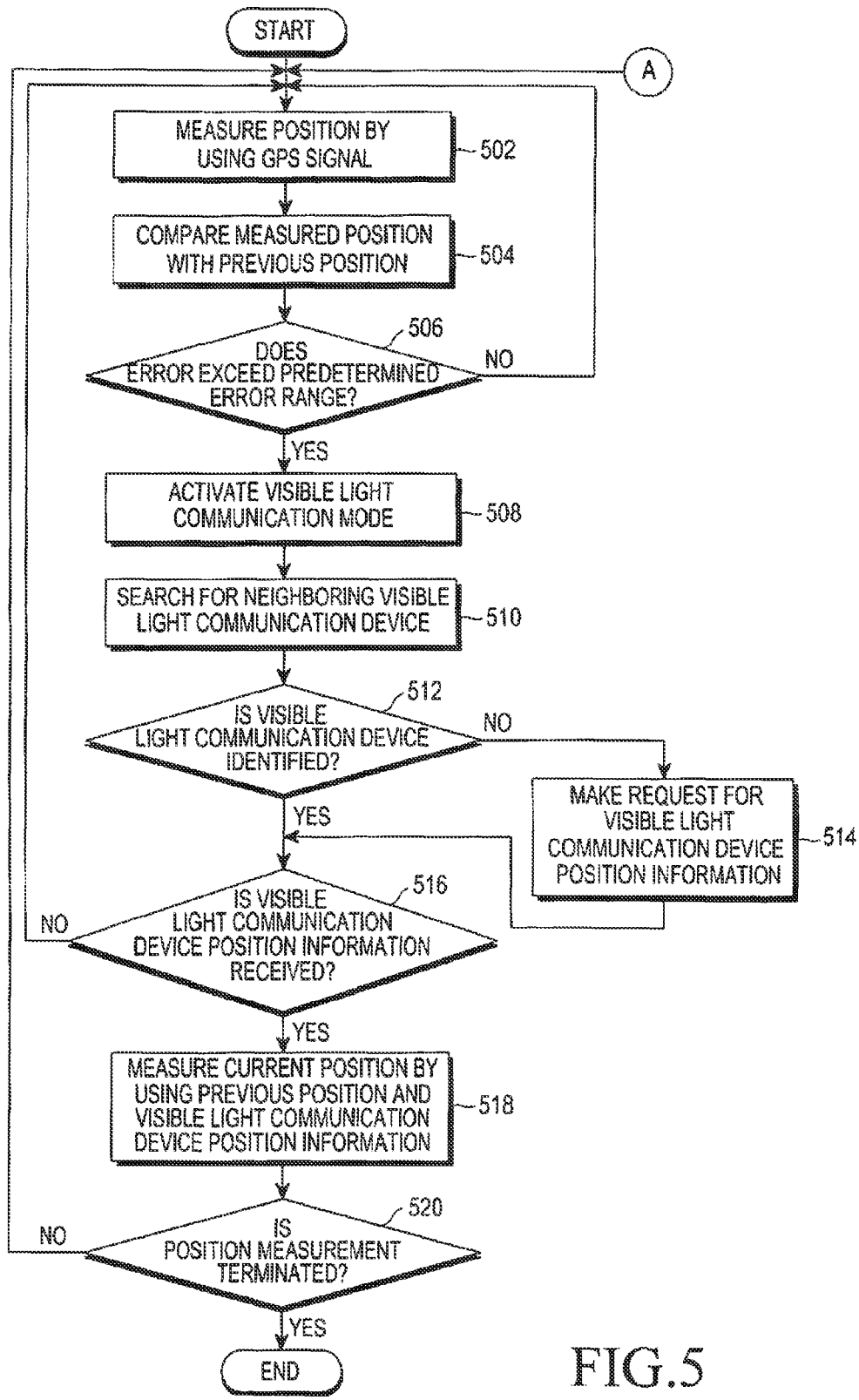
FIGS. 5 and 6 are flowcharts illustrating a position measurement operation of a mobile terminal, according to an embodiment of the present invention.
Figure 6:
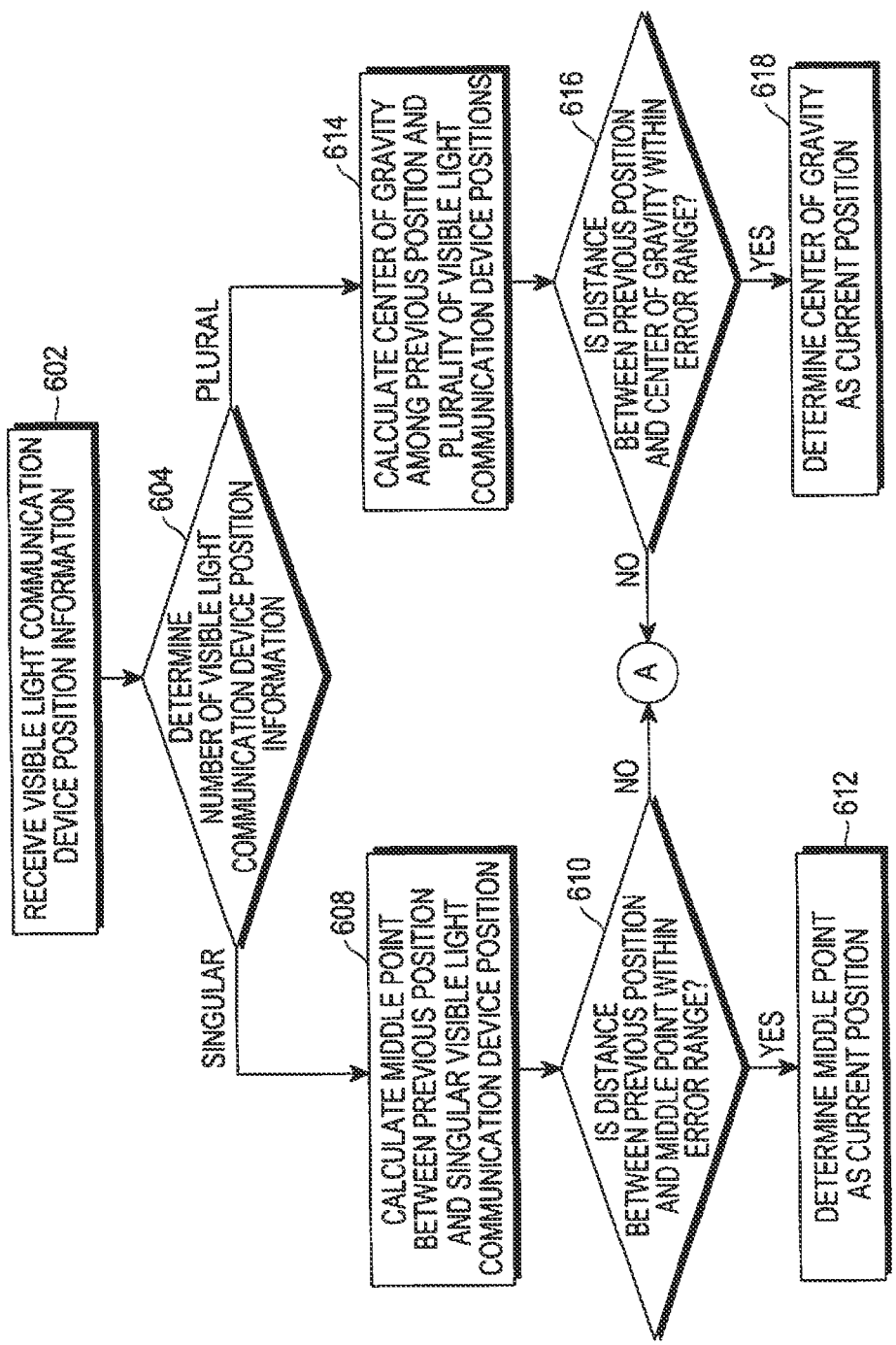

FIGS. 5 and 6 are flowcharts illustrating a position measurement operation in the mobile terminal, according to an embodiment of the present invention. Referring to FIG. 5, the mobile terminal 100 performs a position measurement by using GPS signals from the GPS satellites 50, in step 502. Specifically, the mobile terminal 100 may calculate a coordinate value of a position of the mobile terminal 100 by calculating distances between the GPS satellites 50 and the mobile terminal 100 through the GPS signals. The mobile terminal 100 may calculate the coordinate value of the position of the mobile terminal 100 by receiving three GPS signals.

The mobile terminal 100 compares a measured first position with a position calculated before the first position, in step 504, and determines whether an error exceeds a predetermined error range, in step 506. When the error is not generated or the error does not exceed the predetermined error range, the mobile terminal 100 returns to step 502 to perform a next position measurement using the GPS signals.

When the error exceeds the predetermined error range, the mobile terminal 100 proceeds to step 508 to activate a visible light communication mode, and searches for neighboring visible light communication devices, in step 510. The mobile terminal 100 may search for the neighboring visible light communication device by determining whether a visible light signal is received.

As a result of the search for the visible light communication device, the mobile terminal 100 determines whether the visible light communication device is identified, in step 512. When the visible light signal is received, the mobile terminal 100 may identify the visible light communication device transmitting the visible light signal and visible light communication device position information contained in the visible light signal.

When the visible light communication device is not identified, the mobile terminal 100 broadcasts a signal making a request for the visible light communication device position information, in step 514, since the visible light is not provided from the neighboring visible light communication device. Accordingly, the neighboring visible light communication device may receive the signal making the request for the visible light communication device position information and provide the visible light communication device position information in response to the signal.

After identifying the visible light communication device or making the request for the visible light communication device position, the mobile terminal 100 determines whether the visible light communication device position information is received, in step 516. When the visible light communication device position information is not received, the mobile terminal 100 returns to step 502 to perform a next position measurement using the GPS signals.

When the visible light communication device position information is received, the mobile terminal 100 measures the third position corresponding to the current position by using the second position, corresponding to a position prior to the first position, and the visible light communication device position information, in step 518. The mobile terminal 100 may measure the third position by using one piece of visible light communication device position information, or may measure the third position by using a plurality of visible light communication device position information.

FIG. 6 is a detailed description of step 518, according to an embodiment of the present invention.

Referring to FIG. 6, when receiving the visible light communication device position information, in step 602, the mobile terminal 100 determines the number of pieces of visible light communication device position information, in step 604.

When the number of pieces of visible light communication device position information is one (a single piece), the mobile terminal 100 proceeds to step 608 to perform the position measurement process corresponding to a single piece of visible light communication device position information. Meanwhile, when visible light communication device position information is plural, the mobile terminal 100 proceeds to step 614 to perform the position measurement process corresponding to a plurality of visible light communication device position information.

Figure 7:
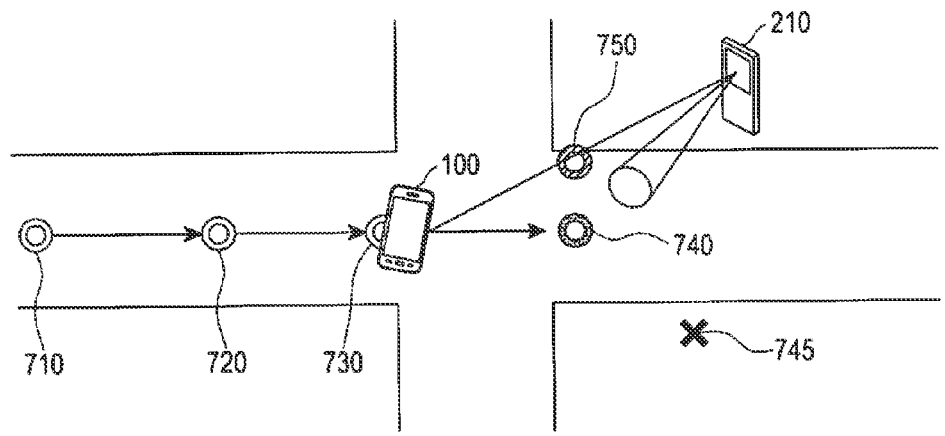
FIG. 7 is a diagram illustrating a position measurement method when there is a single piece of visible light communication device position information, according to an embodiment of the present invention.

FIG. 7 is a diagram illustrating a position measurement method when there is a single piece of visible light communication device position information, according to an embodiment of the present invention. In FIG. 7, the mobile terminal 100 is moving in a direction from positions 710 and 720 to a position 740. FIG. 7 illustrates a case where the first position calculated in the mobile terminal 100 is calculated as a wrong position 745 when an actual position of the mobile terminal 100 corresponds to the position 740, that is, a case where the first position represents the wrong position beyond a predetermined error range.

Referring to FIGS. 6 and 7, when a wrong first position 745 is calculated as described above, the mobile terminal 100 calculates a middle point 750 between a second position 730, corresponding to a position prior to a first position 745, and the position of the one visible light communication device 210, in step 608. Further, the mobile terminal 100 determines whether a distance between the second position 730 and the middle point 750 is within a predetermined error range, in step 610. When the distance between the second position 730 and the middle point 750 is not within the error range, the mobile terminal 100 returns to step 502, of FIG. 5. When the distance between the second position 730 and the middle point 750 is within the error range, the mobile terminal 100 proceeds to step 612 to determine the middle point 750 as a current position.

Figure 8:
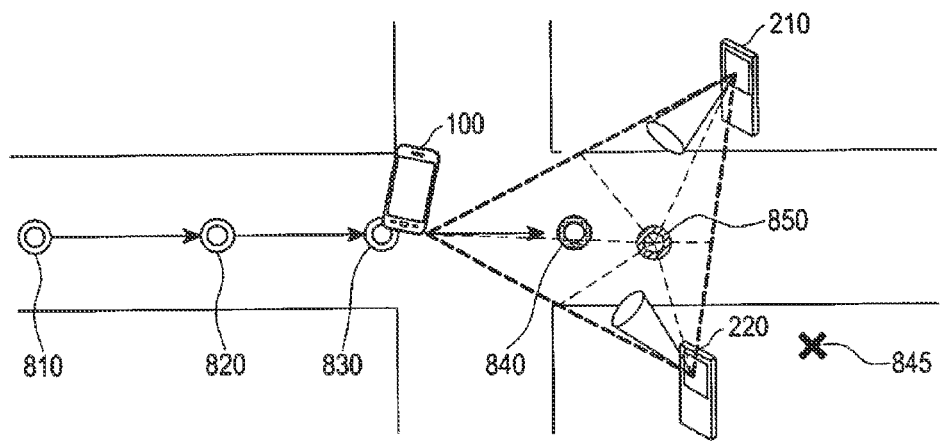
FIG. 8 is a diagram illustrating a position measurement method when there is a plurality of visible light communication device position information, according to an embodiment of the present invention.

FIG. 8 is a diagram illustrating a position measurement method when there is a plurality of visible light communication device position information, according to an embodiment of the present invention. In FIG. 8, the mobile terminal 100 receives a plurality of visible light communication device position information from a plurality of visible light communication devices 210 and 220, and the mobile terminal 100 is moving in a direction from positions 810 and 820 to a position 840. FIG. 8 illustrates a case where the first position calculated in the mobile terminal 100 is calculated as a wrong position 845, when an actual position of the mobile terminal 100 corresponds to the position 840, that is, a case where the first position represents the wrong position beyond a predetermined error range.

Referring to FIGS. 6 and 8, when the wrong first position 845 is calculated as described above, the mobile terminal 100 calculates a center of gravity 850 between a second position 830, corresponding to a position prior to the first position 845, and the plurality of visible light communication devices 210 and 220, in step 614. Further, the mobile terminal 100 determines whether a distance between the second position 830 and the center of gravity 850 is within a predetermined error range, in step 616. When the distance between the second position 830 and the center of gravity 850 is not within the error range, the mobile terminal 100 returns to step 502 of FIG. 5. When the distance between the second position 830 and the center of gravity 850 is within the error range, the mobile terminal 100 proceeds to step 618 to determine the center of gravity 850 as a current position.

When the current position is determined as described above, the mobile terminal 100 proceeds to step 520 of FIG. 5 to repeatedly perform steps 502 to 520 until a position termination event is generated, and to periodically provide position information of the mobile terminal 100.

According to embodiments of the present invention, when it is difficult to receive a GPS signal or when a position measurement result using the received GPS signal is not accurate, the position is calculated using position information of the visible light communication device, and thus, a position measurement is possible and a more accurate position measurement is possible in a shadow area.

While the present invention has been shown and described with reference to certain embodiments thereof, various changes in form and detail may be made therein without departing from the spirit and scope of the present invention as defined by the appended claims. For example, although the mobile terminal has been described as an example of the position measurement apparatus in embodiments of the present invention, any apparatus for performing a position measurement, such as, for example, a navigation apparatus or the like may be applied. Further, although it has been described that there are two visible light communication devices in the embodiments of the present invention, the position measurement may be performed by receiving visible light communication device position information from one or more visible light communication devices.

What is claimed is:

1. A method of measuring a position of a mobile terminal, the method comprising:
   generating a first position by using a GPS signal;
   activating a visible light communication mode of the mobile terminal;
   receiving visible light communication device position information;
   generating a third position based on at least one of the first position and a second position, which corresponds to a position prior to the first position, and the visible light communication device position information; and
   generating a middle point between at least one of the first position and the second position and a position of a visible light communication device, when there is a single piece of visible light communication device position information.

2. The method of claim 1, wherein the visible light communication device position information contains an inherent identification (ID) of the visible light communication device, address information of the visible light communication device, and position information of the visible light communication device located within a building having an address of the visible light communication device.

3. The method of claim 1, wherein
   the middle point is determined as the third position corresponding to a current position of the mobile terminal, when the determined middle point is within a predetermined error range.

4. The method of claim 1, wherein generating the third position comprises:
   generating a center of gravity among at least one of the first position and the second position and positions of a plurality of visible light communication devices, when there is a plurality of visible light communication device position information; and
   determining the center of gravity as the third position corresponding to a current position of the mobile terminal, when the generated center of gravity is within a predetermined error range.

5. The method of claim 1, wherein receiving the visible light communication device position information comprises receiving the visible light communication device position information transmitted from the visible light communication device.

6. The method of claim 1, wherein receiving the visible light communication device position information comprises:
   broadcasting a signal making a request for the visible light communication device position information; and
   receiving the visible light communication device position information from the visible light communication device.

7. The method of claim 6, wherein receiving the visible light communication device position information from the visible light communication device comprises receiving the visible light communication device position information, which the visible light communication device receives from a server.

8. An apparatus for measuring a position, comprising:
   a GPS receiver configured to receive a GPS signal;
   a GPS position calculator configured to generate a first position using the GPS signal;
   a visible light signal transceiver configured to transmit and receive a visible light signal;
   a visible light communication device position calculator configured to generate a position of a visible light communication device by using visible light communication device position information received through the visible light signal transceiver;
   a position calculator configured to generate a third position based on at least one of the first position and a second position, which corresponds to a position prior to the first position, and the position of the visible light communication device, generate a middle point between at least one of the first position and the second position and the position of the visible light communication device when there is a single piece of visible light communication device position information; and
   a controller configured to activate a visible light communication mode, and control the position calculator to generate the third position.

9. The apparatus of claim 8, wherein the visible light communication device position information contains an inherent identification (ID) of a visible light communication device, address information of the visible light communication device, and position information of the visible light communication device located within a building having an address of the visible light communication device.

10. The apparatus of claim 8, wherein the position calculator is further configured to determine the middle point as the third position corresponding to a current position when the generated middle point is within a predetermined error range.

11. The apparatus of claim 8, wherein the position calculator is further configured to generate a center of gravity among at least one of the first position and the second position and positions of a plurality of visible light communication devices when there is a plurality of visible light communication device position information, and determine the center of gravity as the third position corresponding to a current position when the generated center of gravity is within a predetermined error range.

12. The apparatus of claim 8, further comprising a display unit configured to display the third position.

13. A mobile terminal comprising:
a GPS receiver;
a visible light signal transceiver; and
a controller configured to:
   determine a first position using a signal from the GPS receiver,
   generate a position of a visible light communication device using position information from the visible light signal transceiver,
   calculate a third position based on at least one of the first position and a second position corresponding to a position prior to the first position and the position of the visible light communication device,
   activate a visible light communication mode and generate the third position, and
   generate a middle point between at least one of the first position and the second position and the position of the visible light communication device when there is a single piece of visible light communication device position information.

14. The mobile terminal of claim 13, wherein the position information contains an inherent identification (ID) of a visible light communication device, address information of the visible light communication device, and position information of the visible light communication device located within a building having an address of the visible light communication device.

15. The mobile terminal of claim 13, wherein the controller is further configured to generate the middle point as the third position corresponding to a current position when the generated middle point is within a predetermined error range.

16. The mobile terminal of claim 13, wherein the controller is further configured to calculate a center of gravity among at least one of the first position and the second position and positions of a plurality of visible light communication devices when there is a plurality of visible light communication device position information, and determine the center of gravity as the third position corresponding to a current position when the generated center of gravity is within a predetermined error range.

17. The mobile terminal of claim 13, further comprising a display unit configured to display the third position.

* * * * *